(12) United States Patent
Lightner

(10) Patent No.: US 6,639,467 B1
(45) Date of Patent: Oct. 28, 2003

(54) ALTERNATING CURRENT DERIVED FROM DIRECT CURRENT

(76) Inventor: Gene E. Lightner, 706 SW. 296th St., Federal Way, WA (US) 98023

( * ) Notice: Subject to any disclaimer, the term of this patent is extended or adjusted under 35 U.S.C. 154(b) by 0 days.

(21) Appl. No.: 10/352,356

(22) Filed: Jan. 27, 2003

(51) Int. Cl.[7] .............................. H03F 3/00; H03F 3/45; H03F 1/36; H02M 3/335
(52) U.S. Cl. ..................... 330/195; 330/260; 330/79; 363/21.07
(58) Field of Search ................................. 330/195, 260, 330/79; 363/21, 15

(56) References Cited

U.S. PATENT DOCUMENTS

| | | | | |
|---|---|---|---|---|
| 4,876,637 A | * | 10/1989 | Mose et al. | 363/37 |
| 4,939,633 A | * | 7/1990 | Rhodes et al. | 363/98 |
| 5,473,530 A | * | 12/1995 | Giuseppe et al. | 363/131 |
| 5,640,313 A | * | 6/1997 | Takehara et al. | 363/97 |

* cited by examiner

Primary Examiner—Patricia Nguyen

(57) ABSTRACT

Continuous alternating current is derived from a differential operational amplifier supplied by direct current. The differential operational amplifier produces alternating current located on the positive input of the differential operational amplifier. Output of the differential operational amplifier is received by a transformer to produce alternating current. Voltage from the transformer is fed back to the negative input of the differential operational amplifier to provide feedback for the differential operational amplifier. Whereby direct current provided to a differential operational amplifier is transformed to continuous alternating current.

19 Claims, 3 Drawing Sheets

ALTERNATING CURRENT DERIVED FROM DIRECT CURRENT

BACKGROUND OF THE INVENTION

Interest in operation to generate electrical power from direct current is extensive.

State of the art methods to derive rectangular waves to approximate sine waves from a direct current supply are disclosed within U.S. Pat. No. 5,642,275, U.S. Pat. No. 5,563,776 and U.S. Pat. No. 5,781,067. These teachings are devoid of generation of a pure sine wave Well known methods employing differential amplifiers as voltage followers are divulged, for example, within U.S. Pat. No. 5,097,223, U.S. Pat. No. 4,928,059 and U.S. Pat. No. 4,506,230. Aforementioned disclosures are lacking of generation of a pure sixty Hertz sine wave from a direct current.

Overall, the prior art does not embody features of the present invention.

This invention relates to conversion of direct current to continuous alternating current from direct current, employing a differential operational amplifier.

Therefore, an object of this invention is to provide continuous alternating current.

A primary object of this invention is to provide a differential operational amplifier operated by direct current to provide continuous alternating current from direct current devoid of mechanical motion.

A major object of this invention is to provide continuous alternating voltage to become positive input to a differential operational amplifier.

A additional object of this invention is to derive continuous alternating current from the output of the differential operational amplifier.

A fundamental object of this invention is production of continuous alternating current from direct current provided from fuel cells.

An object of this invention is to arrange fuel cell terminals in series to establish direct current for application of a differential operational amplifier.

With the above and other objects in view, this invention relates to the novel features and alternatives and combinations presently described in the brief description of the invention.

OBJECTIVES OF THE INVENTION

A supply of direct current is converted to alternating current by a differential operational amplifier. The supply of direct current is frequently obtained from a stack of fuel cells. The stack of fuel cells consists of terminals connected in series to establish a direct current of adjacent positive and negative terminals, to thus provide direct current. The differential operational amplifier contains a positive input which is provided by an alternating current voltage. The positive input of alternating current develops alternating current by the differential operational amplifier operated as a voltage follower. Alternating current voltage applied on the positive input must be less than the direct current voltage to avoid clipping of the resulting alternating current by the differential operational amplifier. Developed alternating current is transported from the output of the differential operational amplifier with a transformer to establish voltage isolation by magnetic coupling. Voltage from the transformer provides feedback to the negative input of the differential operational amplifier. Magnetic coupling is generally combined with a secondary winding within a step-up transformer to increase voltage of the alternating current. Accordingly a feedback cycle has been accomplished and the supply of direct current is transformed into continuous alternating current without mechanical generation of alternating current. The differential operational amplifier is generally an integrated circuit and composed of field effect transistors selected from the group consisting of MOSFETS and JFETS including in individual or a combination thereof Alternating current voltage applied on the positive input of the differential operational amplifier is a phase 120 degrees, relative to sinusoidal phase of 0 degrees, or a phase of 240 degrees to establish three phase current. Positive input of alternating current furnished to the differential operational amplifier is a sine wave frequency of sixty Hz or, alternately, fifty Hz.

DESCRIPTION OF THE PREFERRED EMBODIMENT

The present invention, in its broadest aspect, is distinguished by producing alternating current from direct current, which comprises: a method claimed to produce alternating current from direct current, and providing a differential operational amplifier, and a supply of direct current. Alternating current voltage is applied to the positive input of the differential operational amplifier. A transformer is located on the output of the differential operational amplifier, for transporting alternating current, and establishing negative feedback to the negative input of the differential operational amplifier to form continuous alternating current whereby direct current provided to a differential operational amplifier is transformed to continuous alternating current.

Key features of this invention are:

Direct current from a fuel cell stack provides anode and cathode terminals, serially connected.

The terminals are of equal voltage of positive polarity and negative polarity.

The essential differential operational amplifier is supplied by direct current to establish continuous alternating current Alternating current input to the non-inverting differential operational amplifier is supplied from an individual phase within a three phase configuration.

Magnetic coupling of the transformer is combined with a secondary winding within a step-up transformer to increase voltage of the alternating current.

BRIEF DESCRIPTION OF THE DRAWINGS

The features that are considered characteristic of this invention are set forth in the appended claims. This invention, however, both as to its origination and method of operations as well as additional advantages will best be understood from the following description when read in conjunction with the accompanying drawings in which:

DETAILED DESCRIPTION OF THE PREFERRED EMBODIMENT

In the preferred embodiment of the present invention, direct current is transformed to alternating current by a differential operational amplifier.

Figure 1:
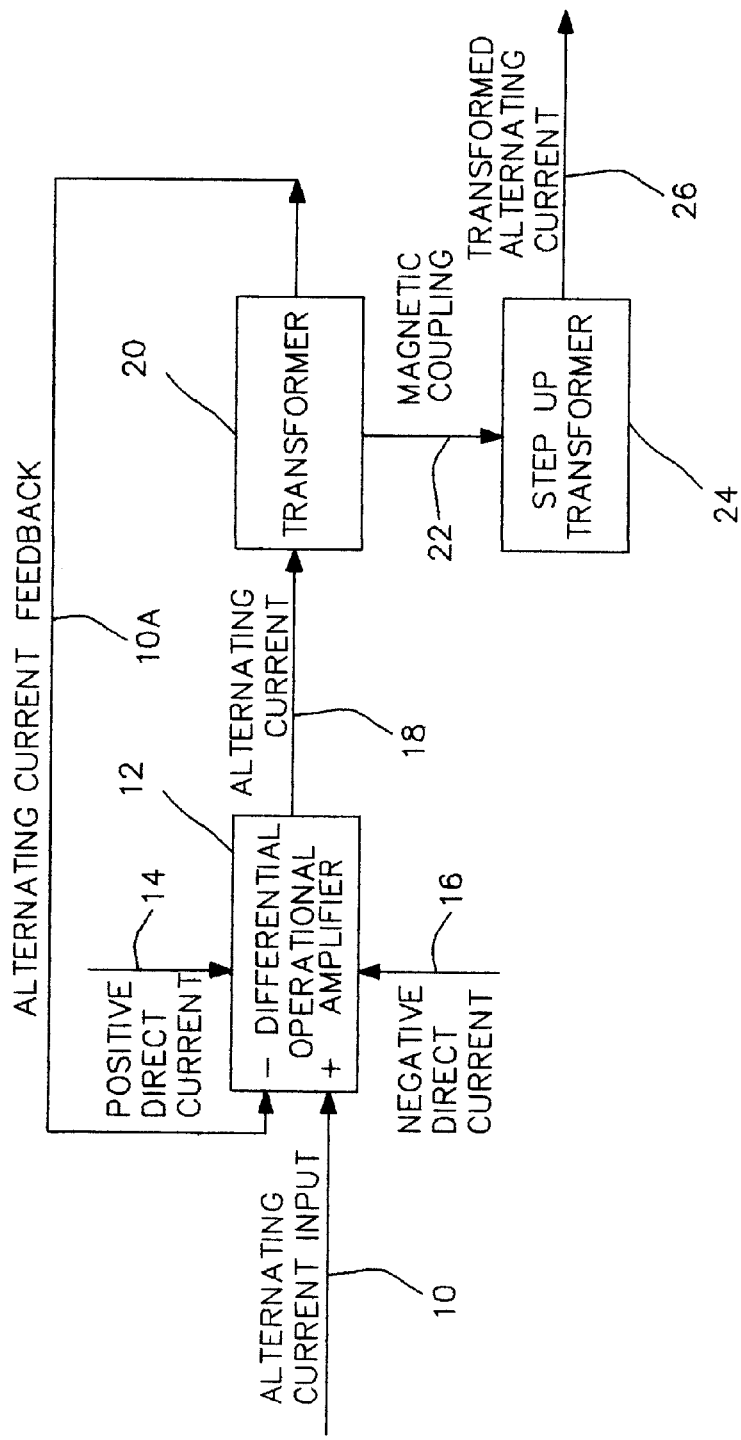
FIG. 1 is a flow sheet denoting the invention as set forth in the appended claims.

The flow diagram of FIG. 1 illustrates the general preferred embodiment of the present invention. In the diagram, rectangles represent stages or functions of the present invention and not necessarily separate components. Arrows indicate direction of flow in the method.

Figure 2:
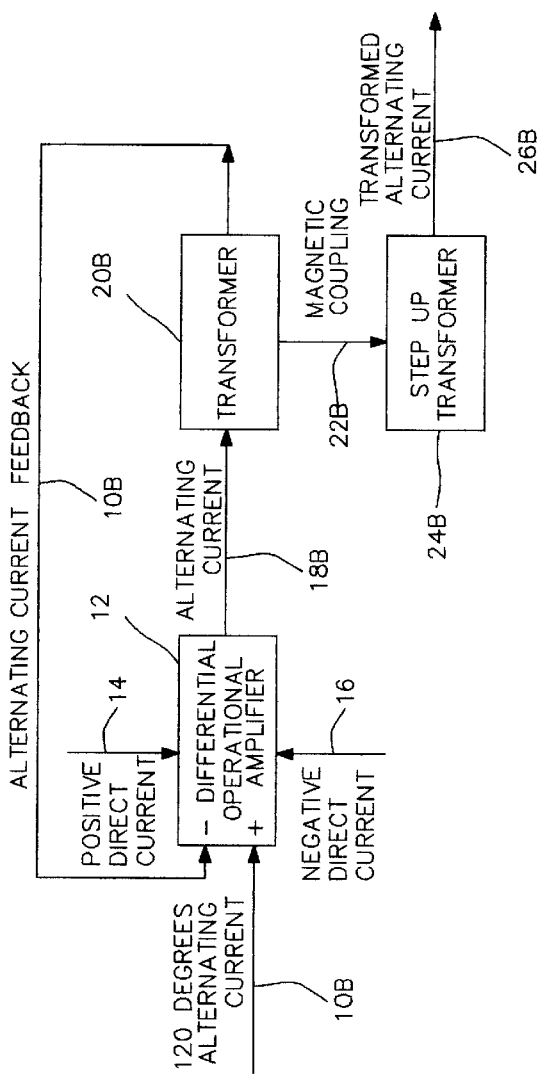
FIG. 2 is a flow sheet denoting an alternating current phase of 120 degrees applied to the positive input of a differential operational amplifier.

Referring to FIG. 1, alternating current input 10 to positive input of differential operational amplifier 12, is supplied by positive direct current 14 and negative direct current 16. Differential operational amplifier 12 generates alternating current 18 applied to transformer 20, to provide alternating current feedback 10A to the negative input of differential operational amplifier 12. Transformer 20, establishes a magnetic coupling 22 for employment in step up transformer 24 to create transformed alternating current input 26. Accordingly a feedback cycle has been accomplished and the supply of direct current is transformed into continuous alternating current without mechanical generation of alternating current. Magnetic coupling 22 is generally Referring to FIG. 2, 120 degrees alternating current 10B input to positive input of differential operational amplifier 12, supplied by positive direct current 14 and negative direct current 16. Differential operational amplifier 12 generates alternating current 18B applied to transformer 20B, to provide alternating current feedback 10B to the negative input of differential operational amplifier 12. Transformer 20B, establishes a magnetic coupling 22B for employment in step up transformer 24B to create transformed alternating current input 26B. Thus a feedback cycle has been accomplished and the supply of direct current is transformed into continuous alternating current. Frequency of 120 phase angle is thus presented. Magnetic coupling is generally combined with a secondary winding within a step-up transformer to increase voltage of the alternating current.

Figure 3:
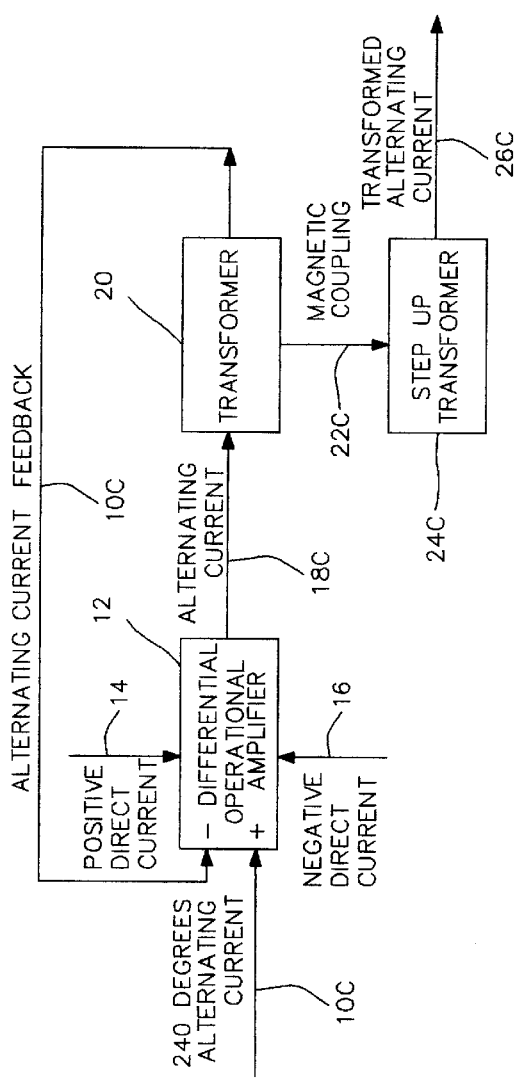
FIG. 3 is a flow sheet denoting an alternating current phase of 240 degrees applied to the positive input of a differential operational amplifier.

Referring to FIG. 3, 240 degrees alternating current 10C input to positive input of differential operational amplifier 12, supplied by positive direct current 14 and negative direct current 16. Differential operational amplifier 12 generates alternating current 18C applied to transformer 20C, to provide alternating current feedback 10C to the negative input of differential operational amplifier 12. Transformer 20C, establishes a magnetic coupling 22C for employment in step up transformer 24C to create transformed alternating current input 26C. Thus a feedback cycle has been accomplished and the supply of direct current is transformed into continuous alternating current. Frequency of 240 phase angle is thus presented.

Figure 4:
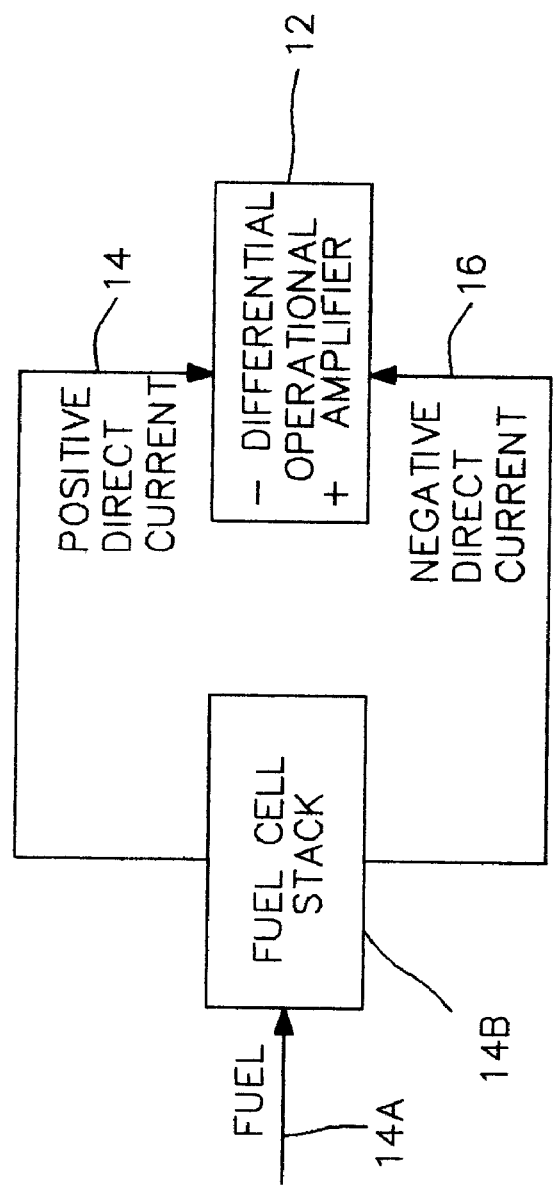
FIG. 4 is a flow sheet portraying fuel cells production of direct current for application by a differential operational amplifier.

Referring to FIG. 4, fuel 14A is provided to fuel sell stack 14B to create positive direct current 14 to positive input of differential operational amplifier 12. Fuel sell stack 14B also creates negative direct current 16 to negative input of differential operational amplifier 12. Fuel 14A is frequently derived by gasification of biomass. Fuel sell stack 14B consists of fuel cells arranged in layers connected in series to provide negative direct current 16 and create positive direct current 14. Therefore a supply of direct current has been established and direct current becomes alternating current.

What is claimed is:

1. A method to produce alternating current from direct current, which comprises:

providing a differential operational amplifier, and providing a supply of direct current, and providing alternating current voltage on the positive input of said differential operational amplifier, and providing a transformer to the output of said differential operational amplifier, and transporting said output of said differential operational amplifier to said transformer to produce alternating current, and establishing negative feedback from said transformer to provide alternating current feedback to negative input of said differential operational amplifier to form continuous alternating current whereby direct current provided to said differential operational amplifier is transformed to continuous alternating current.

2. The method of claim 1 wherein said differential operational amplifier is an integrated circuit.

3. The method of claim 1 wherein said direct current consists of terminals connected in series to establish a direct current of adjacent positive and negative terminals.

4. The method of claim 1 wherein said alternating current is of a frequency of about sixty Hz.

5. The method of claim 1 wherein said alternating current is of a frequency of about fifty Hz.

6. The method of claim 1 wherein said alternating current voltage on the positive input of said differential operational amplifier is a sine wave of frequency about sixty Hz.

7. The method of claim 1 wherein said differential operational amplifier is composed of field effect transistors selected from the group consisting of MOSFETS and JFETS including in individual or a combination thereof.

8. The method of claim 1 wherein said direct current consist of terminals combined in series to provide anode and cathode terminals.

9. The method of claim 8 wherein the terminals are of positive polarity.

10. The method of claim 8 wherein the terminals are of negative polarity.

11. The method of claim 8 wherein the terminals are of equal voltage.

12. The method of claim 1 wherein said alternating current voltage on the positive input of said differential operational amplifier is three phase.

13. The method of claim 1 wherein said method produces three phase current.

14. The method of claim 1 wherein said negative feedback from said transformer provides three phase alternating current feedback to negative input of said differential operational amplifier.

15. The method of claim 1 wherein said alternating current voltage on the positive input of said differential operational amplifier is of phase 120 degrees relative to phase of 0 degrees.

16. The method of claim 1 wherein said alternating current voltage on the positive input of said differential operational amplifier is of phase 240 degrees relative to phase of 0 degrees.

17. The method of claim 1 wherein said direct current is derived from fuel cells.

18. The method of claim 17 wherein the fuel cells are fueled by gasification of a biomass.

19. The method of claim 1 wherein said alternating current voltage applied on the positive input of said differential operational amplifier is of lower voltage than the voltage of said direct current to avoid clipping of the resulting alternating current by said differential operational amplifier.

* * * * *